United States Patent
Jiang et al.

(10) Patent No.: US 12,541,427 B2
(45) Date of Patent: Feb. 3, 2026

(54) SPATIAL-TEMPORAL MEMORY UNCORRECTABLE ERROR PREDICTION SYSTEM

(71) Applicant: Microsoft Technology Licensing, LLC, Redmond, WA (US)

(72) Inventors: Siduo Jiang, San Antonio, TX (US); Cristopher D. Benge, Berryville, VA (US); Yash Jayesh Dagli, Redmond, WA (US); Zhexiong Liu, Redmond, WA (US); Arhatha Bramhanand, Redmond, WA (US); Adam Grenzebach, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 27 days.

(21) Appl. No.: 18/585,370

(22) Filed: Feb. 23, 2024

(65) Prior Publication Data
US 2025/0272192 A1  Aug. 28, 2025

(51) Int. Cl.
*G06F 11/10* (2006.01)

(52) U.S. Cl.
CPC .................. *G06F 11/1068* (2013.01)

(58) Field of Classification Search
None
See application file for complete search history.

(56) References Cited

U.S. PATENT DOCUMENTS

| | | |
|---|---|---|
| 11,853,161 B2 | 12/2023 | Zhang |
| 2022/0374891 A1* | 11/2022 | Zhang .................. G06Q 20/401 |
| 2023/0071667 A1* | 3/2023 | McDonnell .............. G06N 3/08 |
| 2023/0222009 A1* | 7/2023 | Reineke .................... G06F 9/54 |
| | | 717/102 |

(Continued)

OTHER PUBLICATIONS

S. Xu and X. Xu, "ConvTrans-TPS: A Convolutional Transformer Model for Disk Failure Prediction in Large-Scale Network Storage Systems," 2023 26th International Conference on Computer Supported Cooperative Work in Design (CSCWD), Rio de Janeiro, Brazil, 2023, pp. 1318-1323, (Year: 2023).*

(Continued)

*Primary Examiner* — Daniel F. McMahon
(74) *Attorney, Agent, or Firm* — Schwegman Lundberg & Woessner, P.A.

(57) ABSTRACT

Systems and methods are directed to training and using a spatial-temporal transformer to predict memory errors. The system aggregates historical data including error logs from data centers by time windows and generates, from the aggregated historical data, a spatial representation of the errors and a set of micro features for each time window in an observation period. A memory feature vector is generated for each time window by flattening the spatial representation and appending the corresponding set of micro features to an end of the flattened spatial representation. The spatial-temporal transformer is trained by applying the memory feature vector for each time window to a transformer encoder. This training process is repeat for each observation period within a data collection period. During inference (Continued)

time, a similar process is performed to generate inference memory feature vectors for an inference observation period, which are applied to the trained transformer to predict errors.

20 Claims, 6 Drawing Sheets

(56) References Cited

U.S. PATENT DOCUMENTS

| | | | | |
|---|---|---|---|---|
| 2023/0370337 | A1* | 11/2023 | Xu | H04L 41/0896 |
| 2024/0054329 | A1* | 2/2024 | Liu | G06N 3/084 |
| 2024/0167852 | A1* | 5/2024 | Kim | G01D 5/20 |
| 2025/0037426 | A1* | 1/2025 | Zhang | G06V 10/82 |
| 2025/0103779 | A1* | 3/2025 | Zhang | B60W 60/001 |

OTHER PUBLICATIONS

Du, et al., "Predicting Uncorrectable Memory Errors from the Correctable Error History: No Free Predictors in the Field", Proceedings of the International Symposium on Memory Systems, Sep. 2021, 10 Pages.

International Search Report and Written Opinion received for PCT Application No. PCT/US2025/010028, May 12, 2025, 14 pages.

Yu, et al., "HiMFP: Hierarchical Intelligent Memory Failure Prediction for Cloud Service Reliability", 2023 53rd Annual IEEE/IFIP International Conference on Dependable Systems and Networks (DSN), Jun. 2023, pp. 216-228.

* cited by examiner

SPATIAL-TEMPORAL MEMORY UNCORRECTABLE ERROR PREDICTION SYSTEM

TECHNICAL FIELD

The subject matter disclosed herein generally relates to error predictions. Specifically, the present disclosure addresses systems and methods that train and utilize a spatial-temporal model to predict errors in memory and, in particular, to predict uncorrectable errors.

BACKGROUND

In any cloud service, nodes are deployed that comprise memory for processing applications. The memory is not, however, foolproof and defects can develop over time. For example, a typical dynamic random access memory (DRAM) chip comprises thousands of capacitors, each either charged or discharged to denote binary bits. These stored electric charges are vulnerable to alteration due to various internal and external factors (e.g., unstable data transmission along bitlines, unexpected charge losses before bit restoration, significant temperature fluctuations in the operational environment). Such vulnerabilities often lead to inconsistencies between the bits (e.g., data) read from DRAM and the bits originally stored.

To mitigate these inconsistencies, error correction codes (ECCs) are employed to identify and correct erroneous bits. For example, the ECC can be tailored to rectify incorrect bits from a single DRAM chip during memory access at the cache line granularity. These rectifiable errors are termed correctable errors (CEs). Nonetheless, ECCs can be ineffective if multiple erroneous bits occur simultaneously, exceeding the ECC's error-correction capacity, or if certain error patterns escape the ECC's detection capabilities. In such cases, uncorrectable errors (UEs) occur, potentially leading to critical system disruptions. Accordingly, memory UEs are a leading cause of server crashes and downtime in datacenters and is a primary hardware cause of application interruptions.

BRIEF DESCRIPTION OF THE DRAWINGS

Some embodiments are illustrated by way of example and not limitation in the figures of the accompanying drawings.

DETAILED DESCRIPTION

Figure 1:
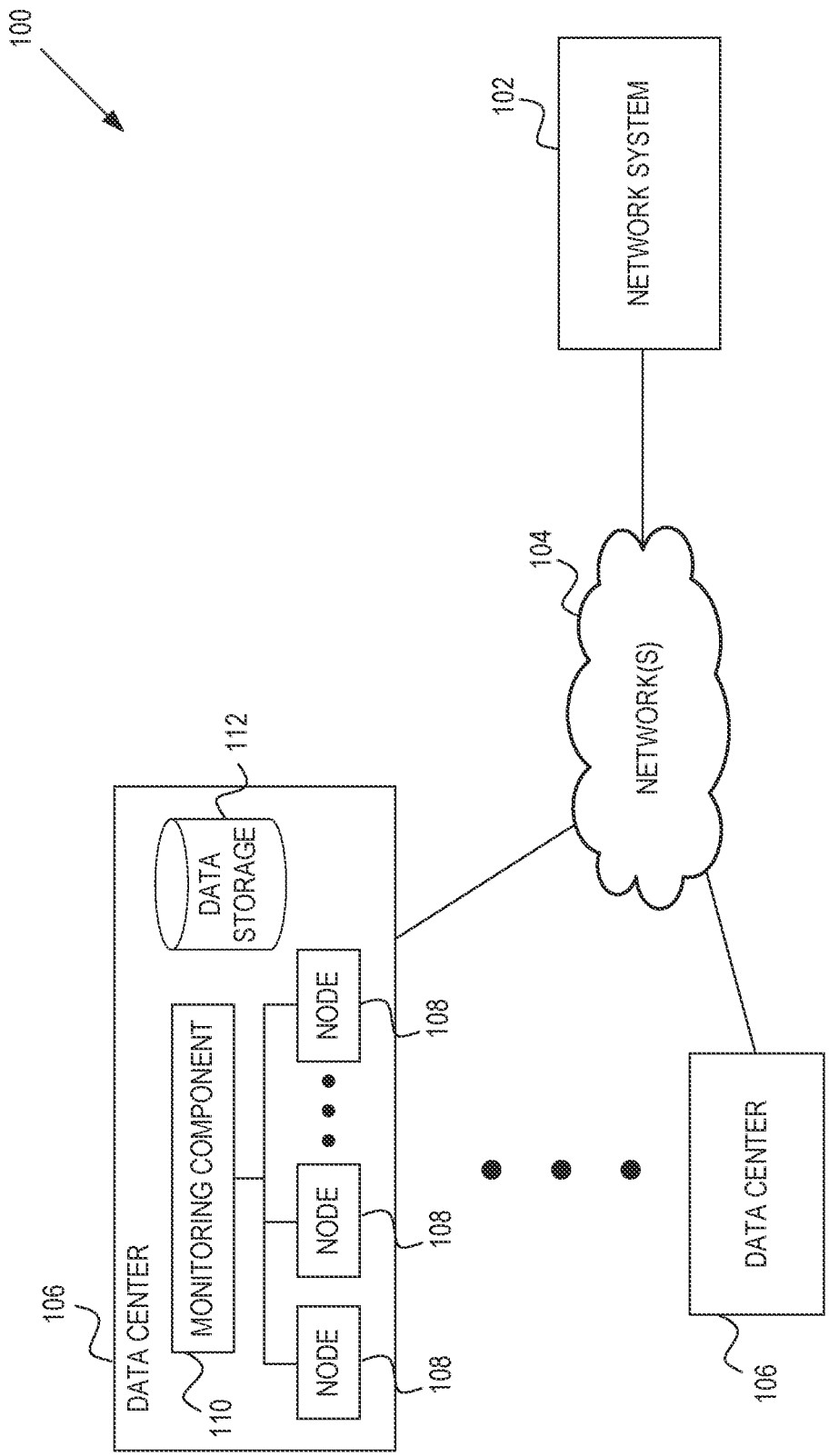
FIG. 1 is a diagram illustrating a network environment suitable training and using a spatial-temporal transformer for predicting memory errors, in accordance with example implementations.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments are directed to training and utilizing a spatial-temporal transformer or machine-learning model to predict uncorrectable errors (UEs). Preventive maintenance can then be triggered based on the prediction to decrease server downtime in large-scale clusters or data centers. For example, a further system can be triggered to mitigate the predicted error by preemptively fixing an issue that is likely to lead to the predicted error. For instance, a dual in-line memory module (DIMM) or random access memory (RAM) chips may be replaced before they are predicted to fail and interruptions occur.

However, the prediction of UEs presents many challenges. Because anomaly UEs are exceedingly rare in memory events, this renders machine learning methods highly vulnerable to imbalanced data since there is an unequal distribution of classes within the dataset (e.g., very few classes of anomaly UEs). This results in high false positives and low recall rates. Furthermore, memory data is inherently noisy and heterogeneous since memory hardware comes from a range of different manufacturers and deployed in diverse operational environments. Finally, predicting UEs demands handling of intricate spatial and temporal variability in the memory framework as defined by correctable errors (CEs) given hardware degradation over its lifecycle and the iterative introduction of new software and hardware configurations.

Additionally, memory uncorrectable errors (UEs) is a hardware cause of server crashes in datacenters and customer interruptions on cloud computing platforms. Currently, leveraging machine learning methods to predict UEs before undertaking preventive maintenance is decreasing server downtime in large-scale clusters. However, conventional machine learning methods suffer from the high false positives and low recall rates.

To address the above challenges, example implementations train a spatial-temporal transformer in memory (STIM) model that learns spatial and temporal features with self-attention mechanisms across memory cells. Historical data including error logs is aggregated from a plurality of nodes (e.g., hardware) of a plurality of data centers. The historical data is decoded to generate a spatial representation of the error logs and to derive a set of micro features (also referred to an a "micro features vector") for each time window in an observation period. In one implementation, the time window is a one-hour window during which error logs are aggregated for that hour. The observation period is a time period of past data that is used to train the model. In one implementation, the observation period is a 3-day period. Thus, in this example, a spatial representation of the error logs is generated for each one-hour window of the three-day observation period. The spatial representation is a matrix or map of bit features that represents where the errors occur in memory, while the set of micro features comprises a vector that represents other or additional features regarding the errors such as, for example, how many errors there were, what was the error range, hardware properties, and/or virtual machine data associated with the errors (e.g., how long did the virtual machine operate before the error). A memory feature vector is then generated by flattening or converting the spatial representation of the error logs (matrix) into a 32-bit vector and appending the set of micro features to the end of the memory feature vector (e.g., the flattened spatial representation) for each time window (e.g., each 1-hour window of error logs). A spatial-temporal transformer or model (used interchangeably herein) is then trained by applying the memory feature vector for each time window for a plurality of observation periods to a linear projection and transformer encoder.

During inference time, an inference memory feature vector based on data for an immediate period of time that is the same number of days as the observation period (e.g., the past three days) is generated in a similar manner and applied to the trained model to predict UEs. As a result, example implementations provide a technical solution to the technical problem of predicting UEs in memory and triggering mitigating actions to decrease server downtime. In particular, the technical solution employs transformer-based models to hardware-related anomaly detection tasks-specifically UE predictions.

FIG. 1 is a diagram illustrating a network environment 100 suitable for training and using a spatial-temporal transformer for predicting memory errors, in accordance with example implementations. A network system 102 is communicatively coupled, via a network 104, to a plurality of data centers 106. The network system 102 is configured to train the spatial-temporal transformer using historical data accessed from hardware within the plurality of data centers 106. The network system 102 also predicts, using the trained spatial-temporal transformer, UEs and triggers one or more mitigation actions. This can allow for timely replacement of memory hardware modules, such as, a DIMM to prevent potential catastrophic system failures.

In some implementations, the network system 102 also comprises a system (not shown) that provides cloud services to enterprises and organizations that utilize the functionalities of the network system 102. In some cases, the network system 102 comprises an enterprise system that is configured to track and control operations of the enterprises and organizations. In some cases, the enterprise system includes a cloud-based software-as-a-service (SaaS) system that provides a plurality of applications, protocols, and functionalities to the enterprises that allow the enterprises to integrate business processes and share information across business functions and employee hierarchies. In these implementations, the network system 102 utilizes the plurality of data centers 106 for storage of the applications and protocols as well as enterprise/organizational data. The network system 102 is discussed in more detail in connection with FIG. 2 and FIG. 3.

Each data center 106 is a service data center or cloud data center managed or otherwise associated with an entity of the network system 102. Each data center 106 is a physical location that comprises servers, data storage drives, and network equipment. The servers provide a computing infrastructure which may comprise different types of servers with varying memory and processing power. The data storage can include block storage devices and/or file storage devices. A monitoring component 110 is positioned over the data storage (e.g., over nodes 108 of the data storage) and logs telemetry data that comes from the data storage whenever an error is detected. The telemetry data can then be used to train the spatial-temporal transformer or used to predict future errors as will be discussed in further detail below.

Any of a variety of types of connections and networks 104 may be used in the network environment 100. For example, the connection to the network 104 can be a Wireless Fidelity (Wi-Fi, IEEE 802.11x type) connection, a Worldwide Interoperability for Microwave Access (WiMAX) connection, or another type of wireless data connection. In some embodiments, the network 104 includes one or more wireless access points coupled to a local area network (LAN), a wide area network (WAN), the Internet, or another packet-switched data network. Accordingly, a variety of different configurations are expressly contemplated.

In example implementations, any of the systems, devices, or networks (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other computers that lack the structures discussed herein or are otherwise unable to perform the functions discussed herein. Accordingly, a special-purpose machine configured according to the systems and methods discussed herein provides an improvement to the technology of similar machines.

Moreover, any of the components illustrated in FIG. 1 or their functions may be combined, or the functions described herein for any single component may be subdivided among multiple components. Additionally, any number of data centers 106 may be embodied within the network environment 100. While only a single network system 102 is shown, alternative implementations contemplate having more than one network system 102 (e.g., each localized to a particular region) to perform the operations discussed herein.

Figure 2:
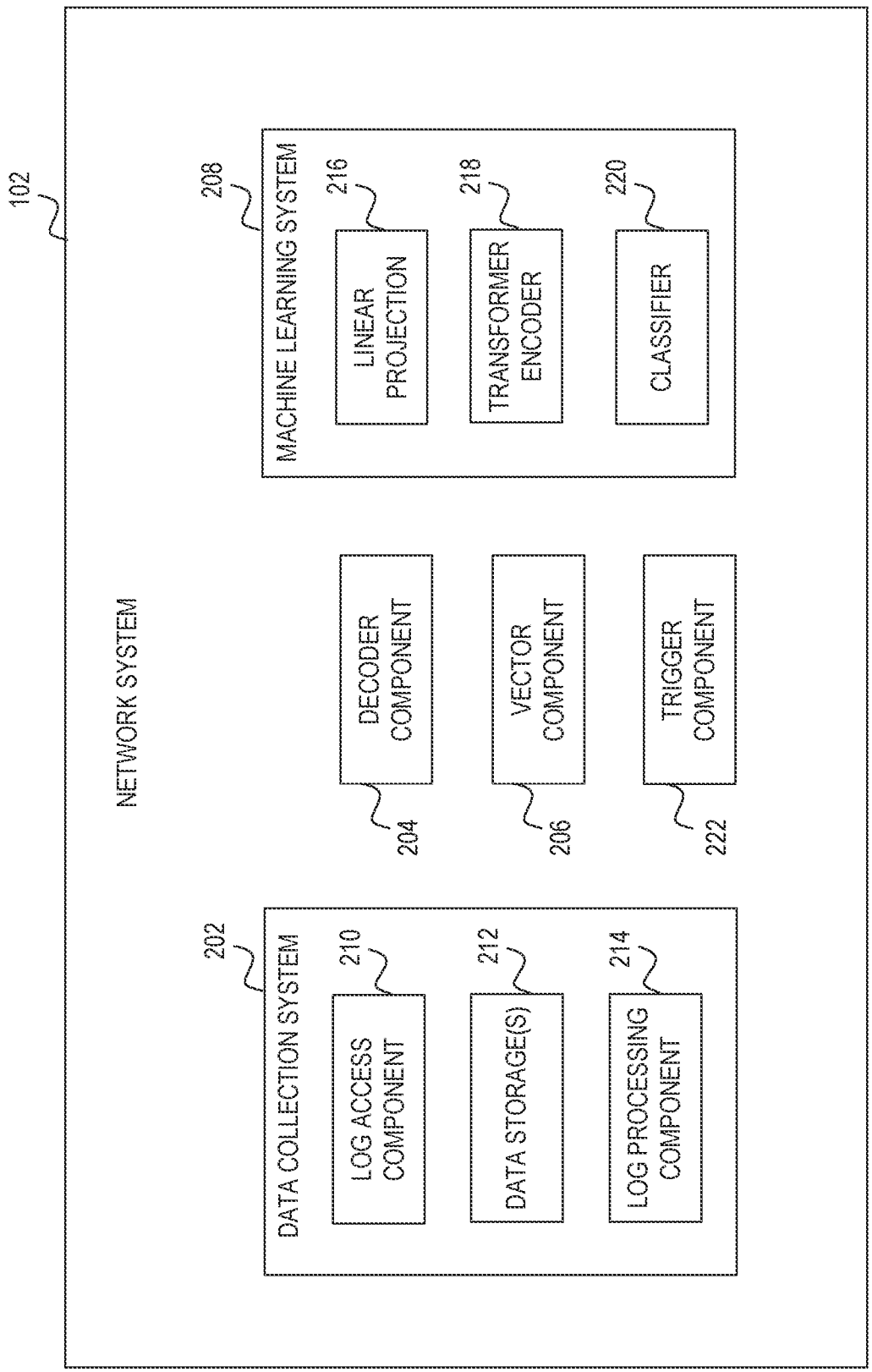
FIG. 2 is a diagram illustrating components of a network system for training and using the spatial-temporal transformer for predicting memory errors, according to some example implementations.

FIG. 2 is a diagram illustrating components of the network system 102 for training and using the spatial-temporal transformer for predicting memory errors, according to some example implementations. To enable these operations, the network system 102 comprises a data collection system 202, a decoder component 204, a vector component 206, and a machine learning system 208, all communicatively couple to each other. Other components not shown may be embodied within the network system 102 but not utilized for example implementations.

The data collection system 202 aggregates historical data from each of the plurality of data centers 106 and preprocesses the historical data before providing the data to other components of the network system 102. The data collection system 202 comprises a log access component 210, one or more data storages 212, and a log processing component 214.

The log access component 210 accesses telemetry data from nodes of the data centers 106. In example implementations, a monitoring system is positioned over these nodes (e.g., sits on top of the hardware) and logs the telemetry data that come from the hardware whenever an error is detected. The telemetry data comprises a collection of timestamped series of logs that indicates errors that occur on each chip or node such as when correctable errors (CEs) occurred and when uncorrectable errors (UEs) occurred as well as a time that each error occurred, where each error occurred, and what kind of error it was. These error logs are accessed by the log access component 210 and can be stored to the data storage 212.

The error logs are processed by the log processing component 214 into more usable data for machine learning. In example implementations, the log processing component 214 comprises a ETL (extraction, transformation, and loading) that transforms the error logs into aggregated data. Because error logs are not continuous (e.g., sporadically logging when an error occurs), the data needs to be aggregated such that the error logs are in a same format. In one implementation, the data is aggregated on an hourly basis whereby all errors that occur in a particular hour will be aggregated together. It is noted that other time windows may be used for aggregating the data. The aggregated data can be stored to the data storage 212.

Collectively, the historical data accessed by the log access component 210 is raw data that contains a set of micro-level and bit-level memory features. The micro-level memory features (also referred to as "micro features") can include an error-count; an error-type; failed pages, devices, banks, locations; running time, and so forth. The bit-level memory features can indicate 8×4 bitmaps of 32 bits (or other dimensions based on DRAM width) that represent where errors occurred. The log processing component 214 performs a data aggregation that sums up all the data points (e.g., bitmaps and micro-level memory features) in each time window (e.g., one-hour window). This aggregation can smooth out anomalies or fluctuations in the raw data. The aggregation for each time window provides the temporal component for training the spatial-temporal trained model.

Additional historical data accessed by the log access component 210 comprises virtual machine (VM) data. The VM data includes information such as how many minutes each virtual machine stayed on when it was on a node for which an erroneous log is extracted. The more a RAM or DIMM is being used, the more likely there will be an error on it and vice versa. As such, this additional data is useful to identify a correlation between a node being used and a number of errors that occur.

The decoder component 204 decodes the aggregated historical data (e.g., the error logs aggregated by time window, the VM data) to generate or derive a spatial representation of errors (also referred to as "bit features") and a set of micro features (or a micro features vector) for each time window (e.g., one-hour time window). In one implementation, the decoder component 204 decodes the error logs numerically/spatially into a bit layout.

The spatial representation comprises an 8×4 bitmap (e.g., an address in RAM results in eight rows of four bits) of 32 bits that represent where errors occurred. 0s represent no errors detected, while 1s in the bitmap represent that an error occurred at that location or bit. Thus, the bitmap provides the spatial component for training the spatial-temporal model. In an alternative implementation, the spatial representation is a 16×4 bitmap. Other sized bitmaps are also contemplated and are not limited to 8×4 or 16×4 bitmaps.

The micro features indicate other features. In one implementation, there are seven micro features. The seven micro features are error count, error type, failed pages, failed devices, failed banks, failed locations, and VM uptime. Error count and error type indicate the number and types of distinct errors within the observation window, while failed pages, failed banks, and failed locations indicate the distinct failures at different levels of the DIMM architecture. VM uptime indicates how long the VM utilizing this DIMM has been running prior to the crash. Alternative implementations can utilize more or less micro features. For example, additional micro features can include an indication of how long since a last replacement or last patch on a DIMM was performed or node properties such as BIOS version. These features can also be aggregated by the same time window (e.g., one-hour). Thus, a micro feature number indicating "3" can indicate that three errors occurred in that particular time window or hour.

The vector component 206 generates a memory feature vector for each time window, which is an input vector for training the spatial-temporal model. In example implementations, the vector component 206 flattens the spatial representation of the error logs into a 32-bit vector. The vector component 206 then appends the micro features to the end of the flatten spatial representation to generate the memory feature vector. In an implementation where there are seven micro features, the memory feature vector is 39-bits long (32-bit vector from the flattened spatial representation plus 7 bits from the micro features).

The memory feature vectors are generated for each time window within an observation period for prediction in a prediction period. In one implementation, the observation period is a past three days (t−3), where data points that have no UEs are filtered out. The next two days (t+2) is the prediction period where memory error labels (CEs/UEs) for corresponding data points presented in the observation period are collected. That is a past three days of historical data is used to predict a next two days of memory errors. Because the data collection system 202 is aware of the features and labels for each DIMM at timestamp, t, a feature-label pair for each DIMM can be constructed. The observation period and prediction period are then shifted a day forward and another feature-label pair for each DIMM is constructed until an end of a collection period. For example, the collection period can be several months.

The memory feature vector for each time window in the observation period is then applied to the machine learning system 208 to train the spatial-temporal model. The machine learning system 208 comprises a linear projection 216, a transformer encoder 218, and a classifier 220. In the present implementation, the machine learning system 208 comprises a transformer neural network. Alternative implementations may use a recurrent neural network (e.g., with a gated recurrent unit), a convolutional neural network, an attention based neural network, or any other types of machine learning.

The linear projection 216 takes the memory feature vectors for the various time windows in the observation period and performs a matrix multiplication. The operations of the linear projection 216 will be discussed in more detail in connection with FIG. 3 below. The result is transmitted to the transformer encoder 218.

Conventionally, transformer encoders are used for language tasks. However, example implementations train the transformer encoder 218 with spatial and temporal features to predict memory errors. The operations of the transformer encoder 218 will be discussed in more detail in connection with FIG. 3.

An output of the transformer encoder 218 is transmitted to a classifier 220. In one example, the classifier 220 is a multilayer perceptron (MLP) classifier. In order to perform classification, a first feature representation of a last layer of the transformer encoder 218 to the classifier 220 is used. The classifier 220 transforms the output of the transformer encoder 218 into a binary output that indicates the memory errors. In some implementations, the memory errors are the UEs.

Because the historical data used to train the spatial-temporal model includes the UEs and CEs that occurred. The predictions outputted from the transformer encoder 218 can be compared to the real UEs that occurred. The spatial-temporal model or transformer encoder 218 can be retrained based on this comparison to fine-tune the model (e.g., by propagating the actual UEs and CEs back through the machine learning system 208).

During inference time, a same process as discussed above is used to predict the UEs. Thus, the data collection system 202 collects or accesses historical data (e.g., error logs and VM data) for an inference observation period that is a same amount of time as the (training) observation period (e.g., last three days) from one or more data centers that require memory error prediction. The error logs are then processed to generate aggregated data. In one implementation, the error logs are aggregated on an hourly basis. The aggregated data is decoded to generate a spatial representation of errors from the error logs and a set of micro features for each inference time window (e.g., 1-hour time window), whereby the inference time window is a same amount of time as the (training) inference window. An inference memory feature vector is then generated by flattening the spatial representation of the error logs and appending the inference micro features to an end of the flattened spatial representation for each inference time window. Errors are then predicted for an inference prediction period (e.g., next two days) by applying the inference memory feature vectors to the trained spatial-temporal model. The inference prediction period is also a same amount of time as the (training) prediction period.

In example implementations, the predictions are used to trigger a further system to perform an action to mitigate one or more of the predicted errors (e.g., UEs). A trigger component 222 triggers the further system. In one implementation, the trigger component 222 generates a notification or triggers a notification component to generate a notification regarding the one or more predicted errors. The notification can indicate the predicted error for a data center (e.g., dual in-line memory module (DIMM) or random access memory (RAM) chips predicted to fail) and the node where the error is predicted to occur. The notification can be sent to a human user such as worker at the data center where the errors are predicted. The human user can then shut a node down and remove/replace the node/memory. Alternatively, the notification can be sent to a machine user or machine component that can preemptively fix an anticipated issue that may cause the error. In these cases, the trigger component 222 can trigger a component at the data center to preemptively fix the issue.

Figure 3:
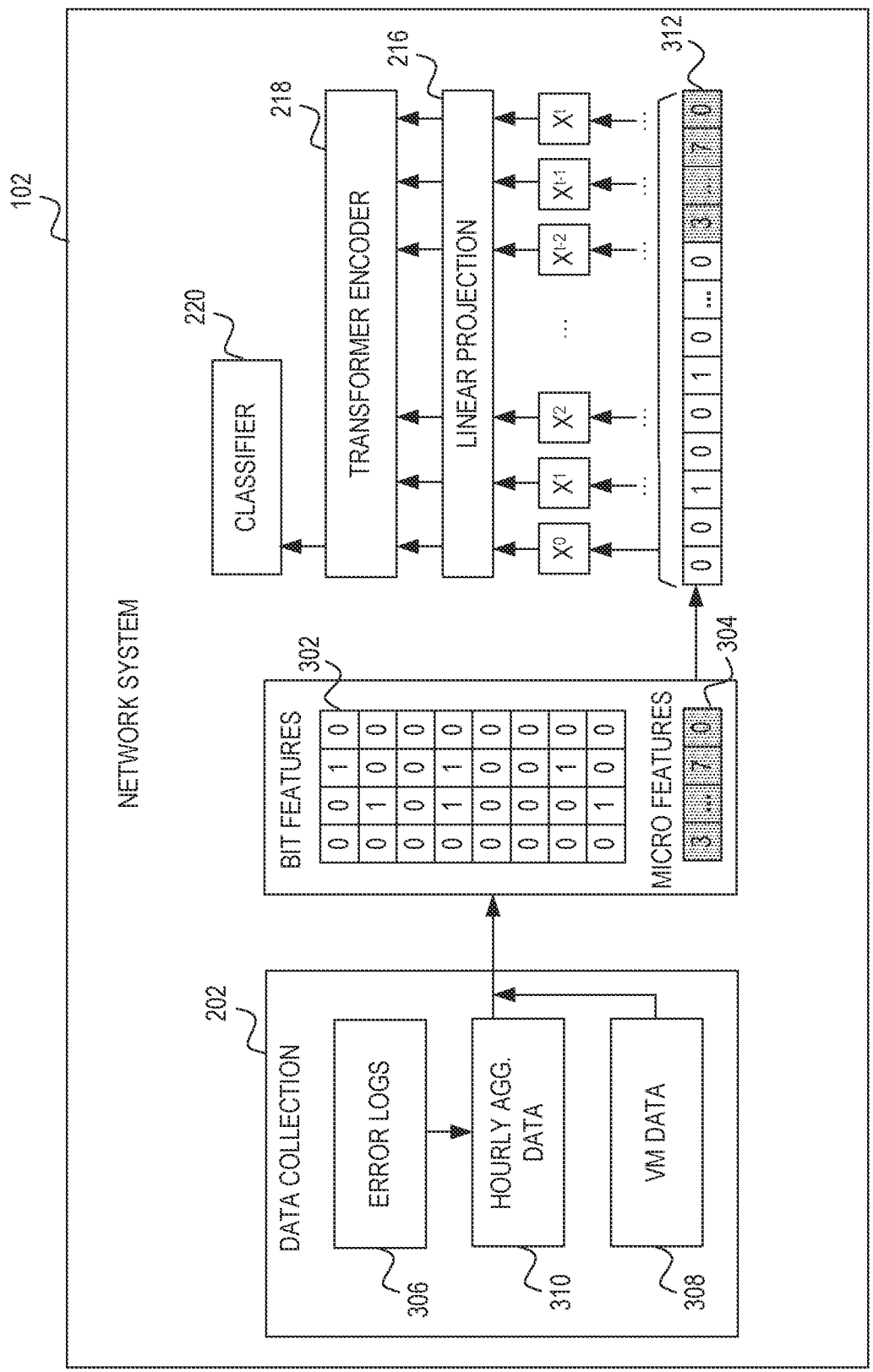
FIG. 3 is a diagram showing an example framework illustrating operations within the network system.

FIG. 3 is a diagram showing an example framework illustrating operations within the network system 102. The framework includes data collection (by the data collection system 220), bitmap features 302, micro features 304, the transformer encoder 218, and the classifier 220.

In a data collection phase, error logs 306 (e.g., historical data) are accessed from each of the plurality of data centers 106. For example, the data collection system 202 accesses telemetry data from nodes (e.g., hardware) of the data centers 106. The telemetry data comprises a collection of timestamped series of error logs 306 that indicates errors that occur on each chip or node such as when correctable errors (CEs) occurred and when uncorrectable errors (UEs) occurred as well as a time that each error occurred, where each error occurred, and what kind of error it was. Data collection also includes accessing virtual machine (VM) data 308. This additional VM data 308 may be useful, for example, to identify a correlation between a node being used and a number of errors that occur.

In example implementations, data from the error logs 306 are extracted, transformed, and loaded as aggregated data. The extraction, transformation, and loading is performed by the log processing component 214 or ETL. In one implementation, the log processing component 214 transforms the error logs 306 into hourly aggregated data 310 whereby all errors that occur in a particular hour will be aggregated together. It is noted that other time windows may be used for aggregating the data. The hourly aggregated data 310 and the VM data 308 can then be combined.

The decoder component 204 converts the telemetry data into a physical layout of the hardware. The result is a spatial representation of the errors in a 8×4 bitmap of bit features 302. The bit features represent locations on the DIMM on the memory. The decoder component 204 also identifies the micro features 304, which can be arranged in a vector format.

The spatial-temporal network or transformer is trained using standard optimizer and hyperparameter optimization techniques. All parameters can be set at tunable, although the transformer can also be frozen or tuned with sparse training techniques.

Given a very sparse p×q bitmap S' at (hourly) timestamp i, where p is the row number and q is the column number, the vector component 206 flattens $S^{(i)}$ into a 1-dimensional vector $S'^{(i)}$, where $S'^{(i)} \in R^{pq \times 1}$. In order to leverage micro features $G^{(i)} \in R^{r \times 1}$ at timestamp i, where r is the dimension of micro features, the vector component 206 concatenates $S'^{(i)}$ and $G^{(i)}$ into a memory feature vector 312 based on $X^{(i)} = [S'^{(i)} \in G^{(i)}]$, where $X^{(i)} \in R^{m \times 1}$, m=pq+r.

In an observation period, the machine learning system 208 takes a sequence of the memory features $X=[X^{(1)}, X^{(2)}, \ldots, X^{(t)}]$, where t is the length of the feature sequence (e.g., size of the t-hour window or the time window), $X \in R^{m \times t}$. To this end, the inputs X contain m features in t-size observation period, where t=72 for t=72 hours (3 days) and m=39 features (p=8, q=4, r=7) in accordance with one example. Therefore, the UE prediction task is formulated as using X to predict binary labels y for UE predictions.

Given that the transformer model uses a constant latent vector with size d throughout all of its layers, X is mapped into latent memory features $X \in R^{d \times t}$ d dimensions with a trainable linear projection 216 (Eq. 1). The output of the linear projection 216 is fed to the transformer encoder 218.

$$\tilde{X} = XW. \qquad (1)$$

In the framework, the transformer encoder 218 comprises a stack of L identical layers, where each layer has two major blocks. The first one is a self-attention block (SAB) in Eq. 4.

$$[q, k, v] = \tilde{X}U_{qkv}, \quad (2)$$

$$A = \text{softmax}\left(\frac{qk^T}{\sqrt{D}}\right), \quad (3)$$

$$SAB(\tilde{X}) = Av, \quad (4)$$

where $U_{qkv} \in R^{3d \times t}$ projects each memory feature representation $\tilde{X}$ to query vector $q \in R^{d \times t}$, key vector $k \in R^{d \times t}$, and value vector $v \in R^{d \times t}$. The dot products performed between queries (q) and keys (k) are scaled by a scalar $\sqrt{d}$, passing to a Softmax function to obtain attention scores A. The attention scores are used to multiply values (v) so the memory feature $\tilde{X}$ is weighed.

A second block transforms the weighted $\tilde{X}$ using a Multi-Layer Perceptron (MLP), where a Gaussian Error Linear Unit (GELU) activation function and (0.5) dropout is used. In addition, a layer normalization is applied before a self-attention block (SAB) and MLP block, and residual connections after the SAB and the MLP block. The overall transformer encoder 218 is formulated as $$\tilde{X}'_{l-1} = SAB(Norms(\tilde{X}_{l-1})) + \tilde{X}_{l-1}, \quad (5)$$

$$\tilde{X}_l = MLP(Norms(\tilde{X}'_{l-1})) + \tilde{X}'_{l-1}, \quad (6)$$

where l=0, 1, 2, . . . , L is the layer number. Each encoder layer/uses the output of the encoder from the previous layer $\tilde{X}_{l-1}$. Following, the output of the last layer (layer L) of the transformer encoder 218 is a sequence of memory feature representations in a n-size observation period. The first representation $\tilde{X}_L^i$ at (hourly) timestamp i=0 is taken as the input of the classifier 220. The classifier 220 used to predict UEs and CEs is implemented with a linear layer and a Sigmoid function.

$$\tilde{y} = MLP(\tilde{X}_L^0), \quad (7)$$

where $\tilde{y}$ is the prediction. Binary cross-validation loss is used to train the model, which is described as $$\text{Loss}(y, \tilde{y}) = -y\log(\tilde{y}) - (1-y)\log(1-\tilde{y}) \quad (8)$$

where y is the ground truth label for UE predictions.

Figure 4:
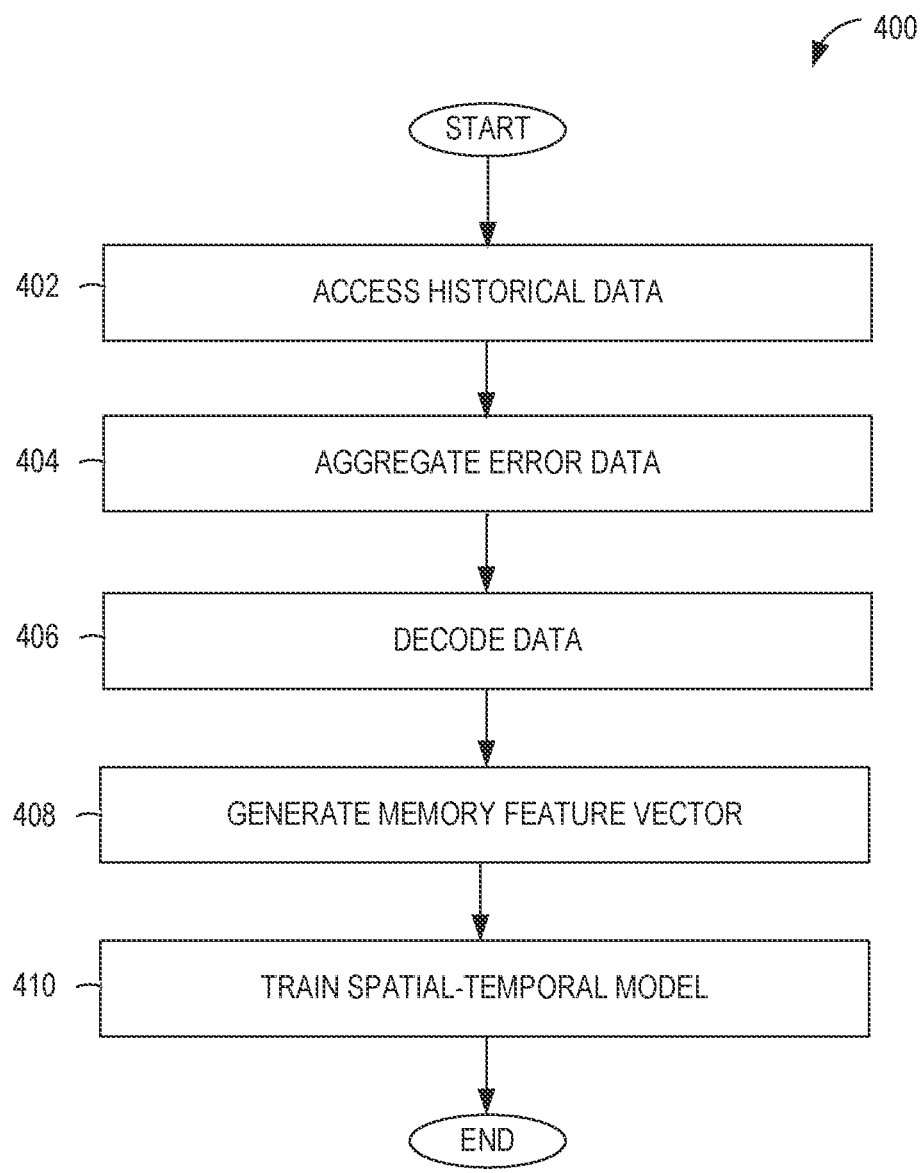
FIG. 4 is a flowchart illustrating operations of a method for training a spatial-temporal transformer to predict errors, according to some example implementations.

FIG. 4 is a flowchart illustrating operations of a method for training a spatial-temporal transformer to predict errors, according to some example implementations. Operations in the method 400 may be performed by the network system 102 in the network environment 100 described above with respect to FIG. 1 through FIG. 3. Accordingly, the method 400 is described by way of example with reference to these components in the network system 102. However, it shall be appreciated that at least some of the operations of the method 400 may be deployed on various other hardware configurations or be performed by similar components residing elsewhere in the network environment 100. Therefore, the method 400 is not intended to be limited to these components.

In operation 402, the data collection system 202 accesses historical data from each of the plurality of data centers 106. Specifically, the log access component 210 accesses telemetry data from nodes of the data centers 106. The telemetry data comprises a collection of timestamped series of logs that indicates errors that occur on each chip or node such as when correctable errors (CEs) occurred and when uncorrectable errors (UEs) occurred as well as a time that each error occurred, where each error occurred, and what kind of error it was. The data collection system 202 also accesses corresponding virtual machine (VM) data.

In operation 404, the log processing component 214 processes the historical data. In example implementations, the log processing component 214 comprises a ETL (extraction, transformation, and loading) that transforms the error logs into aggregated data. In one implementation, the data is aggregated on an hourly basis whereby all errors that occur in a particular hour will be aggregated together. While example implementation discuss aggregating errors, alternative embodiments may combine error signatures in a different way such as averaging the errors or bit features.

In operation 406, decoder component 204 decodes the aggregated data to generate or derive a spatial representation of errors (e.g., bit features) and a set of micro features for each time window (e.g., one-hour time window) within an observation period (e.g., 3-day observation period). The spatial representation comprises an 8×4 bitmap of 32 bits that represent where errors occurred. The micro features indicate other features that provide context for the errors such as, for example, an error count, and error type, and VM uptime.

In operation 408, the vector component 206 generates a memory feature vector for each time window in the observation period. In example implementations, the vector component 206 flattens the spatial representation of the error logs into a 32-bit vector for each time window. The vector component 206 then appends the corresponding micro features to the end of each flatten spatial representation to generate the memory feature vector for each time window.

In operation 410, the machine learning system 208 trains the spatial-temporal model by applying the memory feature vectors for the various time windows in the observation period to a neural network. Specifically, the linear projection 216 takes the memory feature vectors for the various time windows and performs a matrix multiplication. The result is transmitted to the transformer encoder 218. The transformer encoder 218 then performs the operations as discussed in FIG. 3 above to derived predictions for a prediction period (e.g., the next two days).

The observation period and prediction period are continually shifted forward by a day (or other time period) and the operations of the method 400 repeated for each shift in a day until the end of a data collection period to train the spatial-temporal transformer encoder 218. Because the historical data used to train the transformer encoder 218 includes the UEs and CEs that occurred. The predictions outputted from the transformer encoder 218 can be compared to the real UEs that occurred. The transformer encoder 218 can be retrained based on this comparison to fine-tune the model (e.g., by propagating the actual UEs and CEs back through the machine learning system 208).

Figure 5:
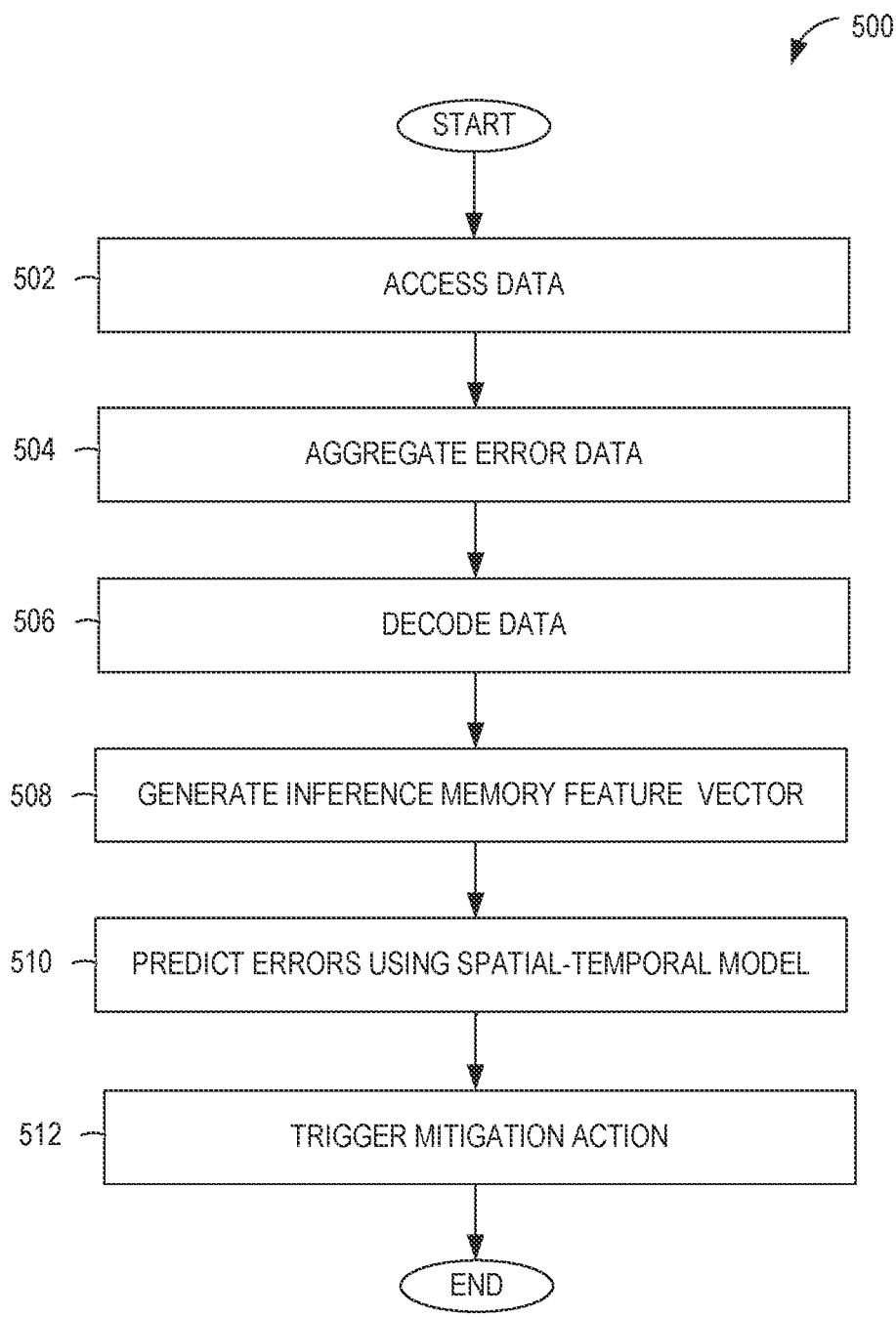
FIG. 5 is a flowchart illustrating operations of a method for predicting errors and triggering a mitigation action, according to some example implementations.

FIG. 5 is a flowchart illustrating operations of a method for predicting errors and triggering a mitigation action, according to some example implementations. Operations in the method 500 may be performed by the network system 102 in the network environment 100 described above with respect to FIG. 1 through FIG. 3. Accordingly, the method 500 is described by way of example with reference to these components in the network system 102. However, it shall be appreciated that at least some of the operations of the method 500 may be deployed on various other hardware configurations or be performed by similar components residing elsewhere in the network environment 100. Therefore, the method 500 is not intended to be limited to these components.

In operation 502, the data collection system 202 collects or accesses historical data (e.g., error logs and VM data) for an inference observation period from one or more data centers that require memory error prediction. The inference observation period is for a same number of days as the observation period used to train the spatial-temporal model. Thus, in one implementation, the inference observation period is for a last three days.

In operation 504, the log processing component 214 processes the historical data for the inference observation period. In example implementations, the log processing component 214 transforms the error logs into aggregated data that is aggregated on an hourly basis (e.g., inference time window is one hour). Thus, all errors that occur in a particular hour will be aggregated together. It is noted that the inference time window used during inference time is a same duration as the time window used for training.

In operation 506, the decoder component 204 decodes the aggregated data to derive an inference spatial representation of errors (e.g., bit features) and a set of inference micro features for each inference time window within the inference observation period. The inference spatial representation comprises an 8×4 bitmap of 32 bits that represent where errors occurred and the micro features provides context for the errors such as, for example, an error count, and error type, and running time.

In operation 508, the vector component 206 generates an inference memory feature vector for each inference time window. In example implementations, the vector component 206 flattens the inference spatial representation of the error logs into a 32-bit vector for each inference time window. The vector component 206 then appends the corresponding inference micro features to the end of each flatten spatial representation to generate the memory feature vector for each inference time window.

In operation 510, errors are predicted for an inference prediction period by applying the inference memory feature vectors to the trained spatial-temporal model. The inference prediction period is a same duration as the prediction period used to train the spatial-temporal model. Thus, in one implementation, the errors are predicted for the next two days. The errors comprise uncorrectable errors (UEs).

In operation 512, the trigger component 222 triggers a mitigation action. In one implementation, the trigger component 222 generates a notification or triggers a notification component to generate a notification regarding the one or more predicted errors. The notification can indicate the predicted error for a data center and the node where the error is predicted to occur. In some cases, the notification can be sent to a machine user or machine component that can preemptively fix an anticipated issue that may cause the error. In these cases, the trigger component 222 can trigger a component at the data center to preemptively fix the issue. For instance, the component can preemptively replace a DIMM that is predicted to fail.

Figure 6:
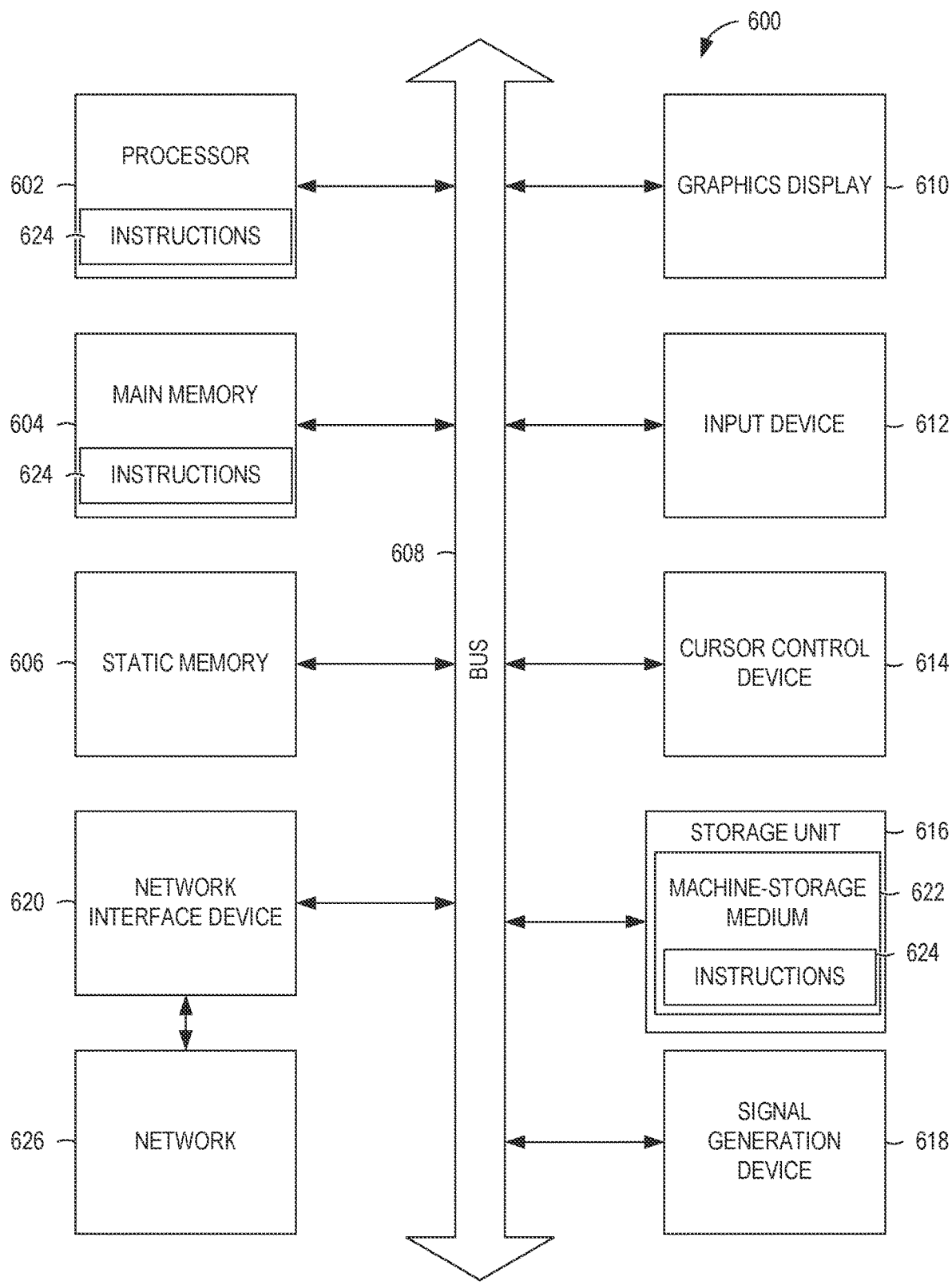
FIG. 6 is a block diagram illustrating components of a machine, according to some example implementations, able to read instructions from a machine-storage medium and perform any one or more of the methodologies discussed herein.

FIG. 6 illustrates components of a machine 600, according to some example implementations, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagram of FIG. 4 and FIG. 5. In one implementation, the instructions 624 can transform the machine 600 into a particular machine (e.g., specially configured machine) programmed to carry out the described and illustrated functions in the manner described.

In alternative implementations, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a network 626 via the network interface device 620.

In some example implementations, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium," and "device-readable medium" mean the same thing and may be used interchangeably in this disclosure. The terms are defined to include both machine-storage medium/media and signal medium/media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some implementations, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented components may be located in a single geographic location (e.g., within a home environment, an office environment, or a server farm). In other example embodiments, the one or more processors or processor-implemented components may be distributed across a number of geographic locations.

EXAMPLES

Example 1 is a method for training and utilizing a spatial-temporal transformer to predict memory errors. The method comprises accessing historical data that includes error logs; generating, from the historical data, a spatial representation of errors and a set of micro features for each time window in an observation period, the spatial representation of errors comprising a matrix of bit features that represents where the errors occur in memory; generating, for each time window, a memory feature vector by flattening the spatial representation and appending the set of micro features to an end of the flattened spatial representation; and training a spatial-temporal transformer to predict errors in a prediction period by applying the memory feature vector for each time window of the observation period to a transformer encoder.

In example 2, the subject matter of example 1 can optionally include, during inference time, aggregating data for an inference observation period immediately prior to an inference prediction period, the data being aggregated by inference time windows; decoding the aggregated data to generate an inference spatial representation of errors and a set of inference micro features for each inference time window within the inference observation period; generating, for each inference time window, an inference memory feature vector by flattening the inference spatial representation and appending the set of inference micro features to an end of the flattened inference spatial representation; predicting errors for the inference prediction period by applying the inference memory feature vector for each inference time window of the inference observation period to the trained spatial-temporal transformer; and triggering a further system to perform an action to mitigate one or more of the predicted errors.

In example 3, the subject matter of any of examples 1-2 can optionally include wherein the observation period and the inference observation period are a same first amount of time; the prediction period and the inference prediction period are a same second amount of time; and the time window and the inference time window are a same third amount of time.

In example 4, the subject matter of any of examples 1-3 can optionally include wherein the observation period and the inference observation period are three days; and the prediction period and inference prediction period are two days.

In example 5, the subject matter of any of examples 1-4 can optionally include wherein the time window and inference time window are one hour.

In example 6, the subject matter of any of examples 1-5 can optionally include wherein triggering the further system to perform the action comprises triggering a notification component to generate a notification regarding one or more of the predicted errors.

In example 7, the subject matter of any of examples 1-6 can optionally include wherein triggering the further system to perform the action comprises triggering a component at a corresponding data center to preemptively fix an issue that will lead to one or more of the predicted errors.

In example 8, the subject matter of any of examples 1-7 can optionally include wherein the spatial representation and the inference spatial representation each comprises a 8×4 map of bit features.

In example 9, the subject matter of any of examples 1-8 can optionally include wherein the set of micro features and the set of inference micro features comprise features that provide context for the errors, the set of micro features and the set of inference micro features including one or more of error count, error type, failed pages, failed devices, and failed banks.

In example 10, the subject matter of any of examples 1-9 can optionally include wherein the training further comprises applying the memory feature vector for each time window to a linear projection prior to applying to the transformer encoder.

In example 11, the subject matter of any of examples 1-10 can optionally include comparing predictions outputted during the training to actual errors that occurred based on the historical data; and retraining the spatial-temporal transformer based on the comparison by propagating the actual errors back through the transformer encoder.

In example 12, the subject matter of any of examples 1-11 can optionally include continually shifting the observation period and prediction period by a day until an end of a collection period; and for each shift in a day, repeating the generating the spatial representation of errors and the set of micro features, generating the memory feature vector, and training the spatial-temporal transformer.

In example 13, the subject matter of any of examples 1-12 can optionally include wherein flattening the spatial representation comprises converting the matrix of bit features into a 32-bit vector.

Example 14 is a method for training and utilizing a spatial-temporal transformer to predict memory errors. The method comprises during inference time, aggregating data for an inference observation period immediately prior to an inference prediction period, the data being aggregated by inference time windows; generating, from the aggregated data, an inference spatial representation of errors and a set of inference micro features for each inference time window within the inference observation period, the inference spatial representation of errors comprising a matrix of bit features that represents where the errors occur in memory; generating, for each inference time window, an inference memory feature vector by flattening the inference spatial representation and appending the set of inference micro features to an end of the flattened inference spatial representation; predicting errors for the inference prediction period by applying the inference memory feature vector to a trained spatial-temporal transformer; and triggering a further system to perform an action to mitigate one or more of the predicted errors.

In example 15, the subject matter of example 14 can optionally include wherein triggering the further system to perform the action comprises triggering a notification component to generate a notification regarding one or more of the predicted errors.

In example 16, the subject matter of any of examples 14-15 can optionally include wherein triggering the further system to perform the action comprises triggering a component at a corresponding data center to preemptively fix an issue that will lead to one or more of the predicted errors.

In example 17, the subject matter of any of examples 14-16 can optionally include training the spatial-temporal transformer, the training comprising: accessing historical data that includes error logs; generating, from the historical data, a spatial representation of errors and a set of micro features for each time window in an observation period, the spatial representation of errors comprising a matrix of bit features that represents where the errors occur in memory; generating, for each time window, a memory feature vector by flattening the spatial representation and appending the set of micro features to an end of the flattened spatial representation; and applying the memory feature vector for each time window of the observation period to a transformer encoder.

In example 18, the subject matter of any of examples 14-17 can optionally include comparing predictions outputted during the training to actual errors that occurred based on the historical data; and retraining the spatial-temporal transformer based on the comparison by propagating the actual errors back through the transformer encoder.

In example 19, the subject matter of any of examples 14-18 can optionally include continually shifting the observation period and prediction period by a day until an end of a collection period; and for each shift in a day, repeating the generating the spatial representation of errors and the set of micro features, generating the memory feature vector, and applying the memory feature vector.

Example 20 is a system for training and utilizing a spatial-temporal transformer to predict memory errors. The system comprises one or more processors and a memory storing instructions that, when executed by the one or more processors, cause the one or more processors to perform operations comprising accessing historical data that includes error logs; generating, from the historical data, a spatial representation of errors and a set of micro features for each time window in an observation period, the spatial representation of errors comprising a matrix of bit features that represents where the errors occur in memory; generating, for each time window, a memory feature vector by flattening the spatial representation and appending the set of micro features to an end of the flattened spatial representation; and training a spatial-temporal transformer to predict errors in a prediction period by applying the memory feature vector for each time window of the observation period to a transformer encoder.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various implementations of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    accessing historical data that includes error logs;
    generating, from the historical data, a spatial representation of errors and a set of micro features for each time window in an observation period, the spatial representation of the errors comprising a matrix of bit features that represents where the errors occur in memory;
    generating, for each time window, a memory feature vector by flattening the spatial representation and appending the set of micro features to an end of the flattened spatial representation;
    training a spatial-temporal transformer to predict errors in a prediction period by applying the memory feature vector for each time window of the observation period to a transformer encoder;
    using the trained spatial-temporal transformer to predict errors; and
    triggering a further system to perform an action to mitigate one or more of the predicted errors.

2. The method of claim 1, further comprising:
    during inference time, aggregating data for an inference observation period immediately prior to an inference prediction period, the data being aggregated by inference time windows;
    decoding the aggregated data to generate an inference spatial representation of errors and a set of inference micro features for each inference time window within the inference observation period; and
    generating, for each inference time window, an inference memory feature vector by flattening the inference spatial representation and appending the set of inference micro features to an end of the flattened inference spatial representation;
    wherein using the trained spatial-temporal transformer to predict the errors comprises applying the inference memory feature vector for each inference time window of the inference observation period to the trained spatial-temporal transformer.

3. The method of claim 2, wherein:
    the observation period and the inference observation period are a same first amount of time;
    the prediction period and the inference prediction period are a same second amount of time; and
    the time window and the inference time window are a same third amount of time.

4. The method of claim 2, wherein:
    the observation period and the inference observation period are three days; and
    the prediction period and inference prediction period are two days.

5. The method of claim 2, wherein the time window and inference time window are one hour.

6. The method of claim 1, wherein triggering the further system to perform the action comprises triggering a notification component to generate a notification regarding one or more of the predicted errors.

7. The method of claim 1, wherein triggering the further system to perform the action comprises triggering a component at a corresponding data center to perform the action to mitigate the one or more of the predicted errors.

8. The method of claim 2, wherein the spatial representation and the inference spatial representation each comprises a 8×4 map of bit features.

9. The method of claim 2, wherein the set of micro features and the set of inference micro features comprise features that provide context for the errors for each inference time window, the set of micro features and the set of inference micro features including one or more of error count, error type, failed pages, failed devices, and failed banks.

10. The method of claim 1, wherein the training further comprises applying the memory feature vector for each time window to a linear projection prior to applying to the transformer encoder.

11. The method of claim 1, further comprises:
comparing predictions outputted during the training to actual errors that occurred based on the historical data; and
retraining the spatial-temporal transformer based on the comparison by propagating the actual errors back through the transformer encoder.

12. The method of claim 1, further comprising:
shifting the observation period and prediction period by a day;
repeating the generating the spatial representation of the errors and the set of micro features, generating the memory feature vector, and training the spatial-temporal transformer; and
recursively performing the shifting and the repeating until an end of a collection period.

13. The method of claim 1, wherein flattening the spatial representation comprises converting the matrix of bit features into a 32-bit vector.

14. A method comprising:
during inference time, aggregating data for an inference observation period immediately prior to an inference prediction period, the data being aggregated by inference time windows;
generating, from the aggregated data, an inference spatial representation of errors and a set of inference micro features for each inference time window within the inference observation period, the inference spatial representation of the errors comprising a matrix of bit features that represents where the errors occur in memory;
generating, for each inference time window, an inference memory feature vector by flattening the inference spatial representation and appending the set of inference micro features to an end of the flattened inference spatial representation;
predicting errors for the inference prediction period by applying the inference memory feature vector to a trained spatial-temporal transformer; and
triggering a further system to perform an action to mitigate one or more of the predicted errors.

15. The method of claim 14, wherein triggering the further system to perform the action comprises triggering a notification component to generate a notification regarding one or more of the predicted errors.

16. The method of claim 14, wherein triggering the further system to perform the action comprises triggering a component at a corresponding data center to perform the action to mitigate the one or more of the predicted errors.

17. The method of claim 14, further comprising training the spatial-temporal transformer, the training comprising:
accessing historical data that includes error logs;
generating, from the historical data, a spatial representation of errors and a set of micro features for each time window in an observation period, the spatial representation of the errors for each time window in the observation period comprising a matrix of bit features that represents where the errors for each time window in an observation period occur in memory;
generating, for each time window, a memory feature vector by flattening the spatial representation and appending the set of micro features to an end of the flattened spatial representation; and
applying the memory feature vector for each time window of the observation period to a transformer encoder.

18. The method of claim 17, further comprising:
comparing predictions outputted during the training to actual errors that occurred based on the historical data; and
retraining the spatial-temporal transformer based on the comparison by propagating the actual errors back through the transformer encoder.

19. The method of claim 17, further comprising:
shifting the observation period and prediction period by a day;
repeating the generating the spatial representation of the errors and the set of micro features, generating the memory feature vector, and applying the memory feature vector; and
recursively performing the shifting and the repeating until an end of a collection period.

20. A system comprising:
one or more processors; and
a memory storing instructions that, when executed by the one or more processors, cause the one or more processors to perform operations comprising:
accessing historical data that includes error logs;
generating, from the historical data, a spatial representation of errors and a set of micro features for each time window in an observation period, the spatial representation of the errors comprising a matrix of bit features that represents where the errors occur in memory;
generating, for each time window, a memory feature vector by flattening the spatial representation and appending the set of micro features to an end of the flattened spatial representation;
training a spatial-temporal transformer to predict errors in a prediction period by applying the memory feature vector for each time window of the observation period to a transformer encoder;
using the trained spatial-temporal transformer to predict errors; and
triggering a further system to perform an action to mitigate one or more of the predicted errors.

\* \* \* \* \*